United States Patent
Dodds (10) Patent No.: US 7,780,905 B2
(45) Date of Patent: Aug. 24, 2010

(54) SUPPORTING CERAMIC ARTICLES DURING FIRING

(75) Inventor: Gerald C. Dodds, Chardon, OH (US)

(73) Assignee: PCC Airfoils, Inc., Beachwood, OH (US)

(*) Notice: Subject to any disclaimer, the term of this patent is extended or adjusted under 35 U.S.C. 154(b) by 0 days.

(21) Appl. No.: 12/074,679

(22) Filed: Mar. 4, 2008

(65) Prior Publication Data

US 2009/0224441 A1 Sep. 10, 2009

(51) Int. Cl.
*C04B 33/32* (2006.01)

(52) U.S. Cl. .................. 264/607; 264/671; 249/155

(58) Field of Classification Search ........... 264/607, 264/611, 671; 249/155
See application file for complete search history.

(56) References Cited

U.S. PATENT DOCUMENTS

| | | | |
|---|---|---|---|
| 2,246,448 A | 6/1941 | Mahan, Jr. | |
| 2,671,969 A | 3/1954 | Mayer | |
| 3,266,116 A | 8/1966 | Rush | |
| 3,623,713 A | 11/1971 | Denison | |
| 3,756,581 A | 9/1973 | Albertini | |
| 3,764,261 A | 10/1973 | Christman | |
| 3,948,594 A | 4/1976 | Irwin, Jr. | |
| 4,174,950 A | 11/1979 | Jalbert | |
| 4,219,328 A | 8/1980 | Pasco et al. | |
| 4,354,830 A | 10/1982 | Gamble et al. | |
| 4,583,581 A | 4/1986 | Ferguson et al. | |
| 4,714,231 A | 12/1987 | Colman | |
| 4,786,542 A * | 11/1988 | Yasuda et al. | 428/116 |
| 5,014,763 A | 5/1991 | Frank | |
| 5,174,752 A | 12/1992 | Chadwick | |
| 5,330,343 A * | 7/1994 | Berteau | 425/175 |
| 5,350,551 A | 9/1994 | Shino | |
| 5,465,780 A | 11/1995 | Muntner et al. | |
| 5,599,166 A | 2/1997 | Deptowicz et al. | |
| 6,352,669 B1 * | 3/2002 | Cooper et al. | 264/608 |
| 6,403,020 B1 | 6/2002 | Altoonian et al. | |
| 6,808,010 B2 | 10/2004 | Dixon et al. | |
| 6,857,464 B2 | 2/2005 | LeBlanc et al. | |
| 6,939,131 B2 | 9/2005 | Maumus et al. | |
| 7,008,220 B2 | 3/2006 | Nakano et al. | |
| 7,125,600 B2 | 10/2006 | Sasaki | |

* cited by examiner

*Primary Examiner*—Steven P Griffin
*Assistant Examiner*—Erin Snelting
(74) *Attorney, Agent, or Firm*—Tarolli, Sundheim, Covell & Tummino LLP (57) ABSTRACT

An adjustable mold is used to mold material to form a first support. A first ceramic article is supported by the first support during firing. The adjustable mold may be adjusted and used to mold material to form a second support having a second configuration. The second support is used to support a second ceramic article during firing. The first and second supports may advantageously be formed with projections which engage the ceramic articles during firing. The length of these projections may be varied by adjusting the mold. A second adjustable mold may be used to form a first retainer which limits upward movement of the first ceramic article during firing. The second adjustable mold may be adjusted and used to form a second retainer which limits upward movement of the second ceramic article during firing.

5 Claims, 5 Drawing Sheets

Fig.9

SUPPORTING CERAMIC ARTICLES DURING FIRING

BACKGROUND OF THE INVENTION

The present invention relates to a method of providing support for ceramic articles during firing of the articles.

Ceramic articles have previously been supported during firing in a furnace or kiln by supports which may be referred to as setters. These supports have been utilized to maintain the ceramic article in a desired shape or configuration during firing of the article at relatively high temperatures.

If the ceramic articles are electronic components or are to be used in association with electronic components, the supports may be constructed as disclosed in U.S. Pat. Nos. 5,350, 551 and/or 7,125,600. If the ceramic articles are dinnerware or similarly shaped articles, the supports may be constructed in the manner disclosed in U.S. Pat. Nos. 3,948,594 and/or 5,174,752. If the ceramic articles are cores for use in the casting of blades or vanes for turbine engines, the supports may be constructed in the manner disclosed in U.S. Pat. Nos. 4,219,328 and/or 5,465,780.

SUMMARY OF THE INVENTION

The present invention relates to a method of providing support for ceramic articles during firing of the ceramic articles. A support for a first ceramic article having a first configuration is formed. This first support is used during firing of the first ceramic article. When a second ceramic article having a different configuration is to be fired, a support having a configuration which is a function of the configuration of the second ceramic article is formed. The second support is used to support the second ceramic article during firing of the second ceramic article.

In addition to the support which engages the lower side of the ceramic article during firing of the article, a retainer may be provided to limit upward movement of the article during firing of the article. The retainer and the support cooperate to maintain the desired configuration of the ceramic article during firing.

The support may have a first array of projections which extend upward from a base of the support and engage a lower side of the ceramic article during firing of the ceramic article. The retainer may have a second array of projections which extend downward from a base of the retainer and are adjacent to the upper side of the ceramic article while the lower side of the ceramic article is engaged by the first array of projections during firing of the ceramic article.

The support and/or retainer may be formed with adjustable molds. The adjustable molds may each have a base with a plurality of movable members which are disposed in recesses which extend away from a side surface of the base. The movable members may cooperate with surfaces of the recesses to at least partially define open end portions of the recesses. During forming of either the support or the retainer, moldable material may fill the open end portions of the recesses and extend at least part way across a side surface on the base of the mold.

It should be understood that the present invention has a plurality of features which may be used separately or together in the manner disclosed herein. For example, ceramic articles may be supported during firing by engaging only the lower side of the ceramic articles with a support. Alternatively, during firing of ceramic articles, a support may engage the lower side of the ceramic articles while a retainer limits upward movement of the upper side of the ceramic articles to hold the ceramic articles between the support and the retainer. Although the support and/or the retainer may be formed with projections which engage surfaces of a ceramic article, the projections may be omitted if desired. Although adjustable molds may be used to form the support and/or retainer, they may be formed with molds which are not adjustable.

BRIEF DESCRIPTION OF THE DRAWINGS

The foregoing and other features of the present invention will become more apparent upon a consideration of the following description taken in connection with the accompanying drawings wherein.

DESCRIPTION OF SPECIFIC EMBODIMENTS OF THE INVENTION

Figure 1:
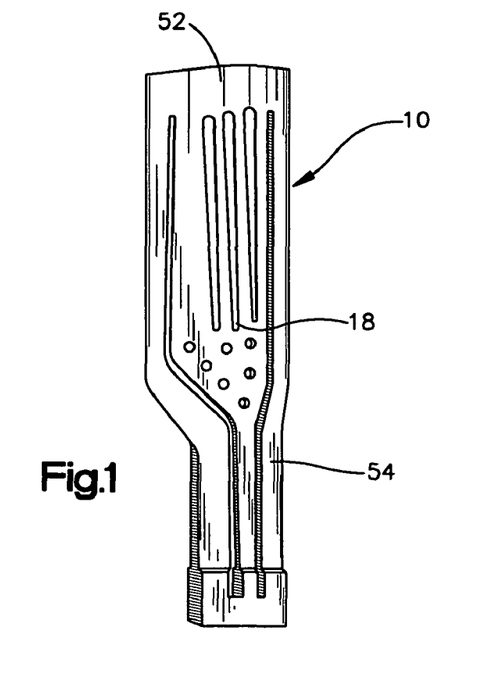
FIG. 1 is a schematic illustration of a known ceramic article.

A ceramic article 10 is illustrated schematically in FIG. 1. The ceramic article 10 is a core for use with a mold during casting of an airfoil for a gas turbine engine. The ceramic article 10 may have any one of many different known constructions, for example, the construction illustrated in U.S. Pat. No. 4,583,581 or U.S. Pat. No. 5,599,166.

Although the ceramic article 10 is a core for use in casting of a blade or vane for a turbine engine, it should be understood that the ceramic article may have a different construction and be utilized for a different purpose if desired. For example, the ceramic article 10 may be dinnerware or an electronic component. It is contemplated that the present invention will be utilized to maintain many different known ceramic articles in a desired configuration during firing of the articles in a furnace or kiln.

Figure 2:
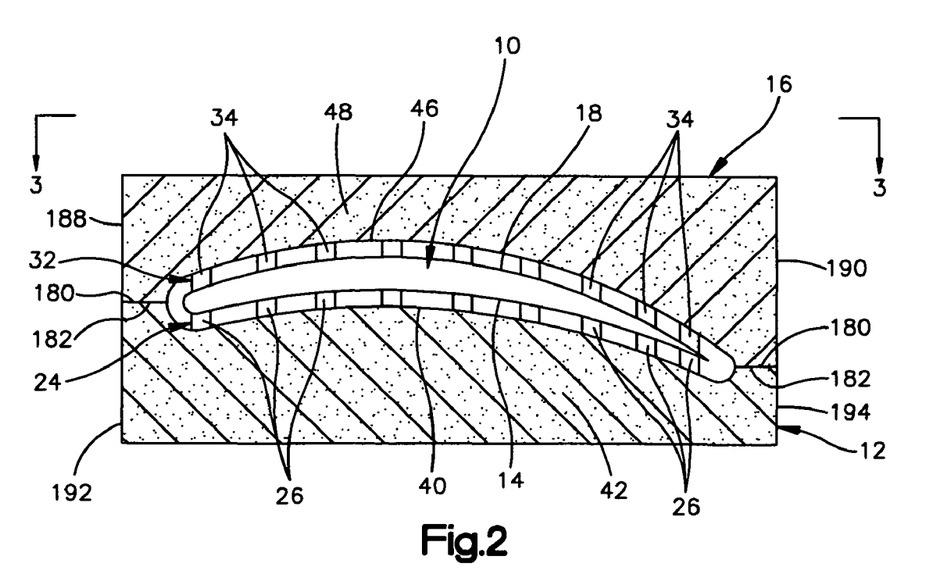
FIG. 2 is a schematic sectional view, on an enlarged scale, depicting the manner in which the ceramic article of FIG. 1 is disposed between a support or lower setter and a retainer or upper setter during firing of the ceramic article.
Figure 3:
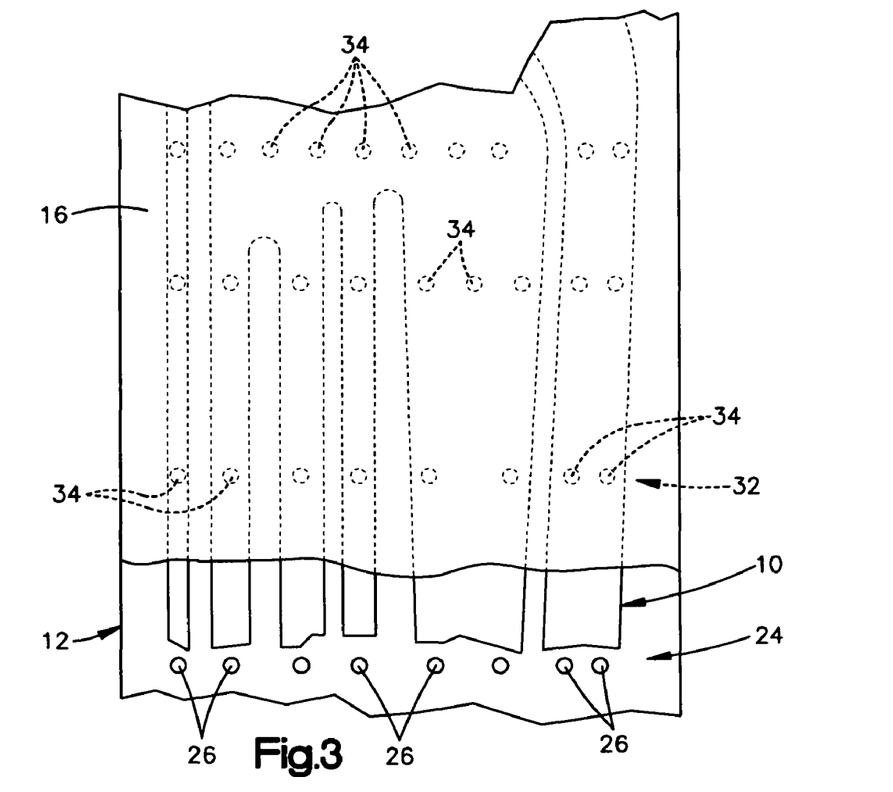
FIG. 3 is a plan view, taken on a slightly reduced scale, along the line 3-3 of FIG. 2, and further illustrating the relationship between the lower support, the ceramic article, and the retainer.

During firing of the ceramic article 10, the ceramic article may be supported by a lower support 12 in the manner illustrated schematically in FIGS. 2 and 3. The lower support 12 may be referred to as a lower setter or setter block. The lower support 12 engages a lower side 14 of the ceramic article 10.

In the embodiment of the invention illustrated in FIG. 2, a retainer 16 is utilized in association with the lower support 12. The retainer 16 is adjacent to an upper side 18 of the ceramic article 10. The ceramic article 10 is held between the lower support 12 and retainer 16 to prevent excessive deformation of the ceramic article during firing. Thus, the lower support 12 blocks downwardly sagging movement of a portion of the ceramic article 10. Similarly, the retainer 16 blocks upward or curling movement of a portion of the ceramic article 10 during firing. By utilizing the lower support 12 and retainer 16, the ceramic article 10 is held so that it maintains a desired configuration during firing of the ceramic article.

If desired, the retainer 16 may be omitted. If this is done, refractory "sand" may be positioned on top of the ceramic article 10. Alternatively, flexible containers or bags of refractory sand may be positioned on top of the ceramic article 10 during firing of the ceramic article. Other known devices may be utilized in place of the retainer 16 if desired. Of course, the retainer 16 may be omitted without being replaced.

In accordance with one of the features of the present invention, an array 24 (FIG. 2) of projections 26 is provided on the support 12. The projections 26 engage the lower side 14 of the ceramic article 10 to support the ceramic article and maintain it with a desired configuration.

Similarly, an array 32 of projections 34 extend downward from the retainer 16 and are adjacent to the upper side 18 of the ceramic article 10. The projections 34 in the upper array 32 of projections are aligned with the projections 26 in the lower array of projections. This results in the ceramic article 10 being held between the two arrays of projections.

In the embodiment of the invention illustrated in FIGS. 2 and 3, the projections 26 in the lower array 24 of projections all have the same length. Similarly, the projections 34 and the upper array 32 of projections all have the same length. It should be understood that at least some of the projections 26 in the lower array 24 of projections may have a length which is different than the length of other projections in the lower array of projections. Similarly, at least some of the projections 34 in the upper array 32 of projections may have a length which is different than the length of other projections in the upper array of projections.

In the specific embodiment of the invention illustrated in FIGS. 2 and 3, the projections 26 in the lower array 24 of projections have the same length as the projections 34 in the upper array 32 of projections. However, the projections 26 in the lower array of projections may be longer than the projections 34 in the upper array of projections. Alternatively, the projections 34 in the upper array of projections may be longer than the projections 26 in the lower array of projections.

The length of each projection 26 in the lower array 24 of projections is determined by the distance which the projection extends upward from a major side surface 40 on a base portion 42 of the lower support 12. Similarly, the length of each projection 34 in the upper array 32 of projections is determined by the distance which the projection extends downward from a major side surface 46 on a base portion 48 of the retainer 16.

In the embodiment of the invention illustrated in FIG. 2, the projections 26 in the lower array 24 of projections all have parallel central axes. Similarly, the projections 34 in the upper array 32 of projections all have parallel central axes. It is contemplated that the central axes of the projections 26 and 34 in the lower and upper arrays 24 and 32 of projections may be skewed relative to each other if desired.

The lower support 12 and retainer 16 are positioned relative to each other so that the central axes of the projections 26 in the lower array 24 of projections are substantially coaxial with the central axes of the projections 34 in the upper array of projections. This allows portions of the ceramic article 10 to be positioned between the aligned projections 26 and 34 in the lower and upper arrays 24 and 32 of projections. However, if desired, the central axes of one or more of the projections 26 in the lower array 24 of projections may be offset from the central axes of corresponding projections 34 in the upper array 32 of projections. In the embodiment of the invention illustrated in FIG. 2, equal numbers of projections are provided in the lower array 24 of projections and the upper array 32 of projections. However, a greater or lesser number of projections may be provided in either the lower array 24 of projections or the upper array 32 of projections if desired.

The illustrated projections 26 in the lower array 24 of projections have a cylindrical configuration. Similarly, the illustrated projections 34 and the upper array 32 of projections have a cylindrical configuration. However, it is contemplated that the projections in the upper array 32 of projections and/or the lower array 24 of projections may have a different configuration if desired. For example, the projections 26 in the lower array of projections may be formed by elongated slats which would extend longitudinally along the longitudinal axis of the ceramic article 10. Similarly, the projections 34 in the upper array 32 of projections may be elongated slats which extend along the longitudinal axis of the ceramic article 10. Of course, the slats in either the lower array 24 or upper array 32 of projections may extend transversely across the ceramic article if desired. The slats may have generally polygonal configuration. However, the slats could have a different configuration if desired.

Although the projections 26 in the lower array 24 of projections have the same configuration as the projections 34 in the upper array 32 of projections, the projections in the upper and lower arrays of projections may have different configurations if desired. For example, the projections 26 in the lower array 24 of projections may have several different configurations. Of course, the projections 34 in the upper array 32 of projections may also have several different configurations which are either the same as or different than configurations of projections 26 in the lower array 24 of projections.

Figure 4:
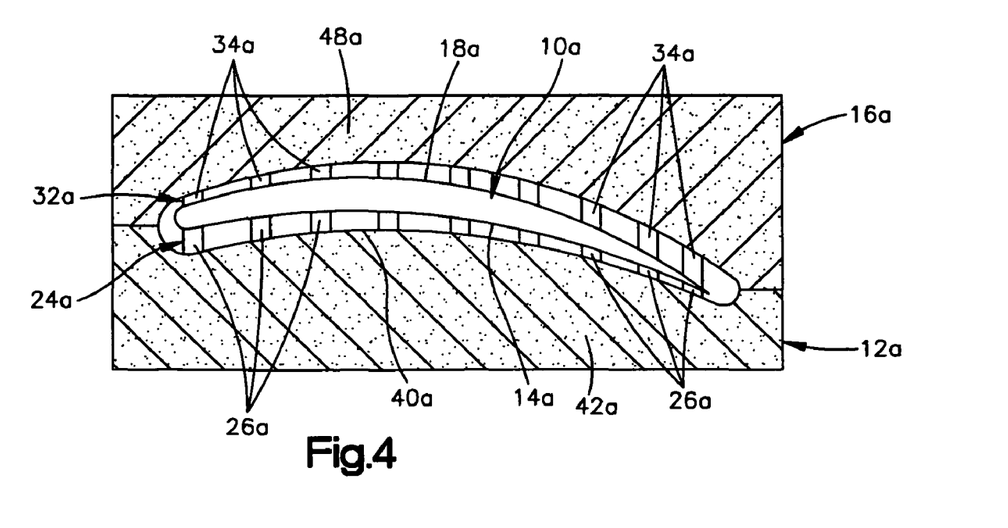
FIG. 4 is a schematic illustration, generally similar to FIG. 2, illustrating how the configuration of projections on the support and retainer may be changed to position a ceramic article having a configuration which is different than the configuration of the ceramic article of FIG. 2.

In accordance with another feature of the present invention, the lower support 12 and retainer 16 may be altered to accommodate changes in the configuration of the ceramic article 10. The lower support 12 and retainer 16 are modified in the manner illustrated in FIG. 4 to accommodate desired changes in the configuration of the ceramic article 10. Since the lower support and retainer of FIG. 4 are generally similar to the lower support and retainer of FIG. 2, similar numerals will be utilized to designate similar components, the suffix letter "a" being associated with the numerals of FIG. 4 to avoid confusion.

The modified ceramic article 10a has a lower side 14a which is engaged by projections 26a in a lower array 24a of projections on a lower support 12a. Upward movement of an upper side 18a of the ceramic article 10a is limited by projections 34a in an upper array 32a of projections on the retainer 16a.

The ceramic article 10a has a configuration which is slightly different than the configuration of the ceramic article 10 of FIGS. 1-3. To accommodate the change in configuration of the ceramic article 10a relative to the ceramic article 10, projections 26a disposed at the left (as viewed in FIG. 4) of a base portion 42a of the lower support 12a are longer than the corresponding projections 26 at the left (as viewed in FIG. 2) portion of the base portion 42 of the lower support 12. Thus, the projections 26a at the left portion (as viewed in FIG. 4) of the base portion 42a of the lower support 12a extend further upward from a major side surface 40a of the base portion 42a of the lower support 12a than do the corresponding projections 26 (FIG. 2) at the left portion of the base portion 42 of the lower support 12.

The projections 34a at the left (as viewed in FIG. 4) portion of the base portion 48a of the retainer 16a have a length which is shorter than the length of the corresponding projections 34 at the left (as viewed in FIG. 2) portion of the base portion 48 of the retainer 16. Thus, the projections 34 at the left portion (as viewed in FIG. 2) of the base portion 48 of the retainer 16 extend downward further than do the corresponding projections 34a at the left (as viewed in FIG. 4) portion of the base portion 48a of the retainer 16a.

In the specific embodiment illustrated in FIGS. 2 and 4, the configuration of the ceramic article 10 changed to a configuration which resulted in the projections 26a at the right (as viewed in FIG. 4) portion of the base portion 42a of the lower support 12a being shorter than the corresponding projections 26 at the right (as viewed in FIG. 2) portion of the base portion 42 of the lower support 12. Similarly, the projections 34a at the right (as viewed in FIG. 4) portion of the base portion 48a of the retainer 16a are longer, that is they extend downward further, than the corresponding projections 34 at the right (as viewed in FIG. 2) portion of the base portion 48 of the retainer 16.

The specific ceramic article 10a illustrated in FIG. 4 required changes in the lengths of the projections in both the upper and lower arrays 32a and 24a of projections at both the left and right (as viewed in FIG. 4) portions of the lower support 12a and the retainer 16a. However, it is contemplated that the ceramic article 10a may have a different configuration which would require a different alteration of the projections in the lower array 24 and/or upper array 32 (FIG. 2) of projections. For example, only the projections 26 at the right (as viewed in FIG. 2) portion of the base 42 and the right portion of the base portion 48 of the retainer 16 may be changed while the length of the projections at the left (as viewed in FIG. 2) portions of the lower and upper arrays 24 and 32 of projections are maintained the same as illustrated in FIG. 2. Of course only the projections 26 (FIG. 2) on the lower support 12 may be changed. Alternatively, only the projections 34 on the retainer 16 may be changed.

The manner in which the length of projections in the lower array 24 and upper array 32 of projections may be varied to accommodate changes in the configuration of the ceramic article 10 has been illustrated in FIGS. 2 and 4 in association with a transverse section through the ceramic article 10. However, it should be understood that the length of the projections in the lower array 24 and upper array 32 of projections may be varied along the length of the article 10. Thus, the length of projections closer to a tip end portion 52 (FIG. 1) of the ceramic article may be changed while the length of projections adjacent to a root end portion 54 of the ceramic article 10 are maintained constant. It is contemplated that the configuration of the ceramic article 10 may be changed so as to require changes in various combinations of projections in the lower and/or upper arrays 24 and 32 of projections.

Although it is believed that the use of the retainer 16 in association with the lower support 12 will be particularly advantageous with certain ceramic articles 10, it is contemplated that with other ceramic articles it may be desired to eliminate the retainer 16. If the retainer 16 is eliminated, the ceramic article 10 may be pressed against the lower array 24 of projections 26 in other ways. For example, particulate material may be placed on the upper side of the ceramic article 10 to press the ceramic article downward towards the projections 26 on the lower support 12.

However, with many ceramic articles, it is believed that it will be advantageous to provide the upper retainer 16 so that ceramic article is held between the lower array 24 of projections and the upper array 32 of projections. Although this holding action, in some circumstances at least, may be promoted by having the lower projections 26 aligned with the upper projections 34 in the manner illustrated schematically in FIGS. 2 and 4, it is contemplated that the lower and upper projections 26 and 34 may be offset from each other. For example, an upper projection 34 may engage the upper side 18 of the ceramic article 10 at a location between locations where lower projections 26 engage the lower side 14 of the ceramic article.

A mold 60 (FIG. 5) is utilized to mold material 62 to form the lower support 12. In accordance with another feature of the present invention, the mold 60 is adjustable to enable the mold to be utilized to form lower supports 12 (FIG. 2) having projections 26 of different lengths. Thus, the same mold 60 may be utilized to form the lower support 12 of FIG. 2 and the lower support 12a of FIG. 4 even though the projections 26 of the lower support 12 have a length which is different than the length of the projections 26a of the lower support 12a. It should be understood that although the adjustable mold 60 is advantageously used to form both lower supports 12 and 12a, one mold may be used to form the lower support 12 and a second mold may be used to form the lower support 12a if desired.

The mold 60 (FIG. 5) includes an adjustable base 64 and side walls 66 which extend upward from the adjustable base 64 of the mold. The side walls 66 cooperate with the adjustable base 64 to form a generally rectangular mold cavity in which the material 62 is molded. Of course, the mold 60 may be constructed so that the mold cavity 70 has a configuration other than a rectangular configuration. For example, the mold cavity 70 may have an arcuate configuration.

The material 62 is molded, in the mold cavity 70, to a shape corresponding to the desired configuration of the lower support 12. Although the material 62 may have any desired composition, the material 62 may be a ceramic material. The ceramic material 62 may, if desired, have a composition similar to the composition of the ceramic material forming the article 10 (FIG. 1). Once the ceramic material 62 (FIG. 5) has sufficiently solidified in the mold cavity 70, the ceramic material is removed from the mold cavity and is fired to form the lower support 12.

Figure 5:
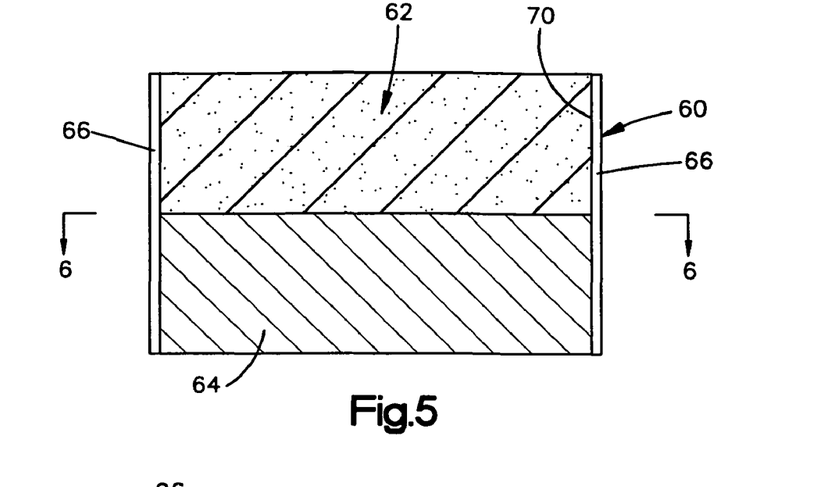
FIG. 5 is a schematized illustration depicting the manner in which an adjustable mold is utilized to mold material to form the supports or lower setters of FIGS. 2 and 4.
Figure 6:
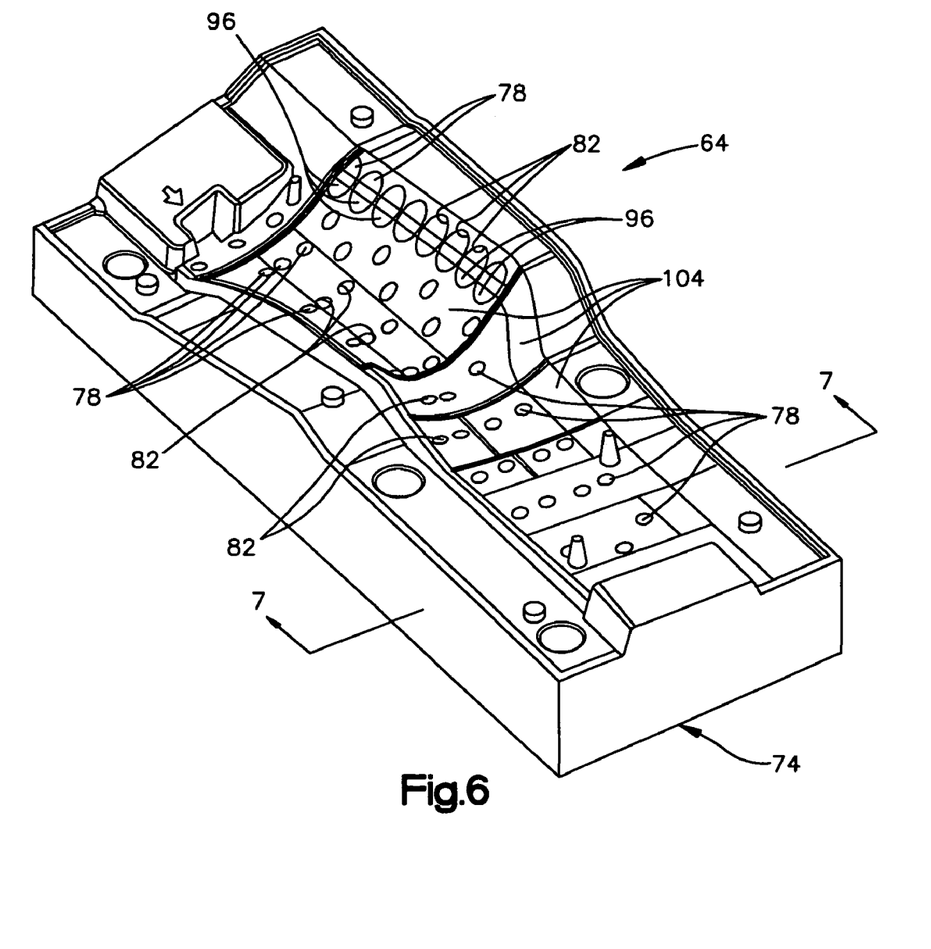
FIG. 6 is a schematic pictorial illustration, taken generally along the line 6-6 of FIG. 5, depicting a base section of the adjustable mold of FIG. 5 and illustrating the relationship of recesses to movable members in the base section of the mold.

The adjustable base 64 (FIGS. 5, 6 and 7) of the mold 60 (FIG. 5) includes a generally rectangular base section 74 (FIG. 6). The base section 74 of the adjustable base 64 is formed of metal. A plurality of movable members 78 (FIG. 6) are mounted on the base section 74. The movable members 78 are formed of metal and are movable relative to the base section 74.

The movable members 78 are disposed in holes or openings 82 (FIGS. 6 and 7) in the base section 74. The movable members 78 have been illustrated in FIG. 6 as having different sizes. Therefore, the movable members 78 are disposed in different size holes or openings 82 formed in the base section 74.

Each of the movable members 78 has an outer side surface which is disposed in engagement with an inner side surface 88 (FIG. 7) of a hole or opening 82 in the base section 74. The outer side surface 86 of each of the movable members 78 is slidable along an inner side surface 88 of the hole or opening 82 in which the movable member is disposed. In the illustrated embodiment of the invention, the movable members 78 have cylindrical outer side surfaces 86 which are disposed in engagement with cylindrical inner side surfaces 88 of the holes 82 in the base section 74. However, it is contemplated that the movable members 78 may have a different configuration if desired. For example, the movable members 78 may have an oval cross section as viewed in a plane extending perpendicular to a central axis 92 of the movable member.

Figure 7:
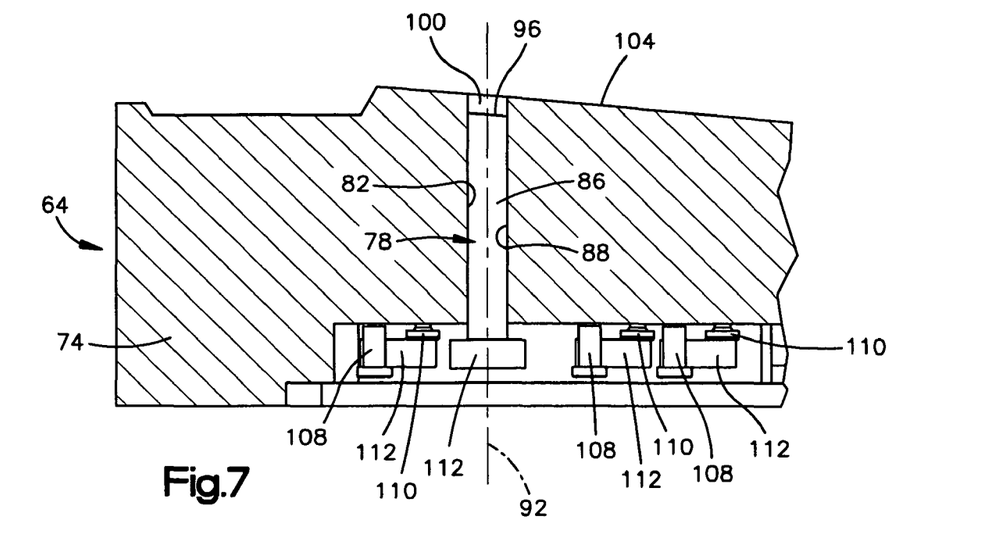
FIG. 7 is a simplified schematic sectional view, taken generally along the line 7-7 of FIG. 6 on an enlarged scale, further illustrating the relationship of one of the movable members to the base section of the adjustable mold.

In the illustrated embodiment of the invention, all of the movable members 78 have the same configuration, that is, cylindrical. The movable members 78 are disposed in engagement with cylindrical side surfaces 88 of holes or openings 82 in the base section 74. However, at least some or all of the movable members 78 may have a different configuration if desired. For example, at least some or all of the movable members 78 may have a polygonal cross sectional configuration, as viewed on a plane extending perpendicular to the central axis 92 of the movable member. Of course, the hole 82 in which the movable member 78 is disposed would have a corresponding configuration, as viewed in a plane extending perpendicular to the axis 92.

Rather than being upright (as viewed in FIG. 7), the movable members 78 may extend along the base section 74 in a direction transverse to the central axis 92. If this is done, the movable members may have a cylindrical configuration or a configuration which is different than the illustrated cylindrical configuration. For example, the movable members 78 may have a polygonal configuration and/or have arcuate longitudinal central axes. The movable members 78 may extend lengthwise or widthwise of the base section 74 if desired.

Figure 8:
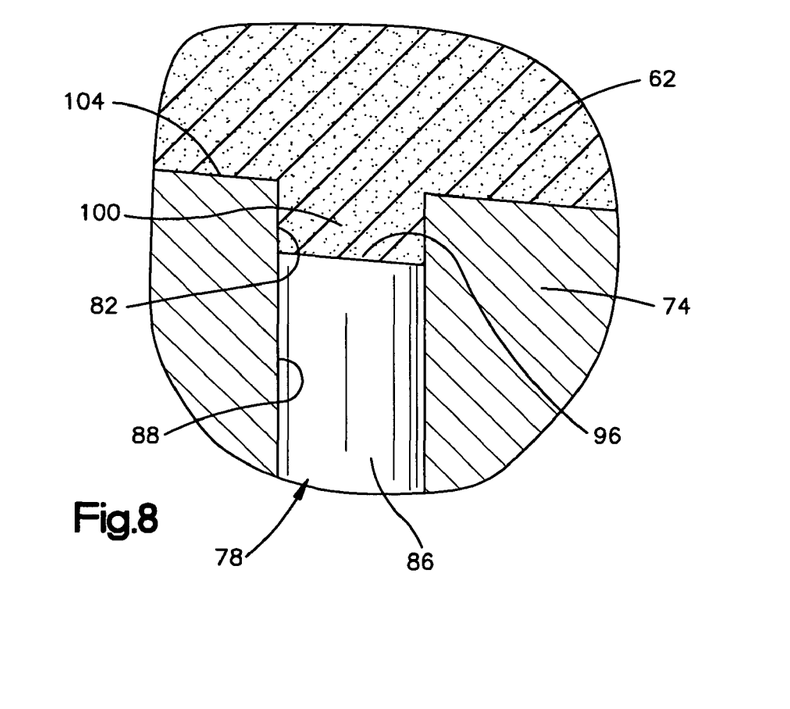
FIG. 8 is an enlarged schematic sectional view illustrating the relationship between the base section of the adjustable mold of FIGS. 5-7 and a movable member during molding of material by the mold to form the support of either FIG. 2 or 4.

Each of the movable members 78 has an end surface 96 (FIGS. 7 and 8). The end surface 96 on the movable member 78 cooperates with the inner side surface 88 of the hole 82 to form an outwardly opening recess 100. The recess 100 extends into the base section 74, that is, downwardly as viewed in FIG. 7, from a major side surface area 104 of the base section 74.

The end surface 96 on the movable member 78 cooperates with the inner side surface 88 of the hole 82 to determine the downward (as viewed in FIG. 7) extent of the recess 100. Thus, the distance which the end surface 96 of the movable member 78 is spaced from the major side surface area 104 of the base section 74 determines the axial extent or depth of the recess 100. The further the end surface 96 of the movable member is spaced from the major side surface area 104 on the base section 74 the greater is the extent of the recess 100.

Once a movable member 78 has been moved to a desired position relative to a base section 74, it is secured against movement relative to the base section by a pair of locking screws 108 and 110 (FIG. 7). The locking screws 108 and 110 engage upper and lower sides of a head end portion 112 of a movable member to hold the movable member against movement relative to the base section 74. The locking screws 108 and 110 are effective to lock the movable members 78 in a desired position relative to the base section 74. Although the locking screws 108 and 110 for one of the movable members 78 have been omitted in FIG. 7, it should be understood that locking screws are provided in association with each of the movable members to secure the movable members in a desired positions relative to the base section 74.

It is contemplated that the movable members 78 may be held against movement relative to the base section 74 by devices other than the locking screws 108 and 110. For example, an external thread convolution connected with a movable member 78 may engage an internal thread convolution connected with the base section 74. The two thread convolutions would cooperate with each other to hold the movable member 78 in a desired position relative to the base section 74. Of course, other known locking devices may be utilized to hold the movable members 74 in desired positions relative to the base section 74.

The specific ceramic article 10 illustrated schematically in FIG. 1 is a core 10 which is mounted within a mold cavity of a mold in which an airfoil for use in a turbine engine is cast. A lower support or setter block 12 (FIG. 2) on which the ceramic article 10 is to be supported during firing, has a configuration which is a function of the desired configuration of the ceramic article 10. The adjustable base 64 (FIG. 6) of the mold 60 (FIG. 5) has a configuration which is a function of the desired configuration of the lower support 12.

In the specific embodiment of the adjustable base 64 illustrated in FIG. 6, the major side surface area 104 on the base section 74 of the adjustable base 64 is utilized to shape the major side surface 40 (FIG. 2) of the lower support 12. The projections 26 on the lower support 12 are shaped in the recesses 100 formed by the cooperation between the movable members 78 and holes 82 in the base section 74 (FIGS. 6 and 7). The greater the distance which the recesses 100 in the base section 74 extend downward (as viewed in FIG. 7) from the major side surface area 104 of the base section 74, the greater will be the axial extent of the projections 26 of FIG. 2.

When an initial design of the ceramic article 10 is to be supported by the lower support 12 (FIG. 2), the projections 26 may all extend for the same distance upward from the major side surface 40 of the lower support. Therefore, when this lower support 12 is to be formed, the movable members 78 are all positioned with the end surfaces 96 spaced the same distance from the major side surface 104 of the base section 74. Alternatively, the major side surface area 40 of the base portion 42 may be configured to support the initial design of the ceramic article 10. If this is to be done, the end surfaces 96 (FIG. 7) on the movable members 78 would be aligned with the major side surface area 104 on the base section 74. This would result in the lower support 12 being formed without any projections 26.

When a second or alternative design of the ceramic article 10 is to be made, the resulting ceramic article 10a (FIG. 4) will have a configuration which is somewhat different than the configuration of the original ceramic article 10. Therefore, the projections 26a (FIG. 4) on the lower support 12a will have a length which is different the length of the projections 26 on the lower support 12 of FIG. 2. In order to modify the length of the projections 26 to form the projections 26a of FIG. 4, the movable members 78 are moved axially relative to the base section 74 (FIG. 7) to adjust the distance between the end surfaces 96 on the movable members 78 and the major side surface 104 of the base section 74. This results in a change in the size of the recesses 100 associated with members 78 which are moved relative to the base section 74.

Once the movable members 78 have been moved to positions corresponding to the desired size of the recesses 100, the adjustable base 64 and side walls 66 (FIG. 5) of the mold 60 can be positioned relative to each other to form a mold cavity 70 which is filled with ceramic material 62. Once the ceramic material 62 has solidified, it is removed from the mold cavity 70 and fired to form the lower support 12a (FIG. 4) for the modified ceramic article 10a. Thus, two different lower supports, that is, the lower support 12 of FIG. 2 and the lower support 12a of FIG. 4 are formed using the same adjustable base 64 of the same mold 60. Of course, the mold 60 can be adjusted to form lower supports having configurations which are different than the configurations illustrated in FIGS. 2 and 4.

Since the adjustable base 64 can be easily changed to accommodate ceramic articles having a configuration which is similar to but somewhat different than the configuration of the ceramic article 10, changes in the design of the ceramic article 10 can be accommodated with a minimum of expense and trouble. However, two separate molds 60 can be used to form the two supports 12 (FIG. 2) and 12a (FIG. 4). Of course this would increase the time and expense required to change the configuration lower support.

When a lower support 12 is to be formed, each of the movable members 78 (FIG. 6) is positioned relative to the base section 74 to form recesses 100 (FIG. 7) having lengths which correspond to the desired lengths of the projections 26 (FIG. 2) to be molded in the recesses. When all of the projections 26 are to have the same length, as shown in FIG. 2, the movable members 78 (FIG. 7) are adjusted so that the end surfaces 96 on the movable members are all spaced the same distance from the major side surface area 104 of the base section 74. This results in all of the recesses 100 having the same axial extent.

However, if some of the projections 26 on the lower support 12 are to be longer than other projections on the lower support, in the manner illustrated schematically in FIG. 4, the movable members 78 would be adjusted so that at least some of the recesses 100 would have an axial extent which is different than the axial extent of other recesses. It should be understood that the particular combination of relatively long and short projections 26 required to support a particular ceramic article 10 will depend upon the configuration of the ceramic article. Of course, the particular combination of deep and shallow recesses 100 (FIG. 7) formed in the adjustable mold 64 will also depend upon the desired combination of long and short projections 26 required to support a ceramic article 10 having a particular configuration.

To adjust the position of a selected movable member 78, the locking screws 108 and 110 (FIG. 7) associated with the head end portion 112 of the selected movable member are screwed into or out of the base section 74 to release the head end portion 112 of the movable member for movement relative to the base section 74. For example, if the head end portion 112 of a movable member 78 is to be moved upward (as viewed in FIG. 7) to decrease the axial extent or depth of a recess 100, the locking screw 110 would be rotated so that a thread convolution on the shank of the locking screw 110 extends further into the base section 74. This would release the head end portion 112 of the movable member 78 to move toward the base section to thereby decrease the depth of the associated recess 100.

Movement of the head end portion 112 of the movable member 78 may be effected by turning the associated locking screw 108 (FIG. 7) to increase the extent to which an external thread convolution on the locking screw 108 engages an internal thread convolution on the base section 74. As this occurs, the head end portion of the locking screw 108 will move the head end portion 112 of the movable member 78 upward (as viewed in FIG. 7) toward the base section 74. This moves the end surface 96 on the selected movable member toward the major side surface 104 of the base section 74.

Once the movable member 78 has been positioned with the end surface 96 at a desired distance from the major side surface area 104 on the base section 74, that is, when the recess 100 has a desired depth, the locking screw 110 is rotated so as to move it axially downward until the head end portion of the locking screw presses against the head end portion 112 on the movable member 78. The head end portion 112 of the movable member 78 is then clamped between the head end portions of the two locking screws 108 and 110. Of course, this is effective to retain the locking member 78 in the desired position relative to the base section 74.

Once all of the movable members 78 have been adjusted and locked into position with their associated locking screws 108 and 110, the recesses 100 will have a desired depth, that is, a desired axial extent downward (as viewed in FIG. 7) from the major side surface area 104 of the base section 74. It is contemplated that the movable members 78 may be positioned with the end surfaces 96 aligned with the major side surface area 104 on the base section 74 so that the recess 100 has a minimum depth, that is, zero depth. If this is done, the lower support 12 (FIG. 2) would be free of projections 26 and the lower side 14 of the ceramic article 10 would engage the major side surface 40 on the lower support.

Alternatively, the movable members 78 may be moved downward to the lower (as viewed in FIG. 7) ends of their range of movement so that the recesses 100 would have a maximum depth. This would result in the projections 26 having a maximum height. Of course, the positions of the movable members 78 may be adjusted anywhere between the positions in which the recesses 100 have a minimum depth and the positions in which the recesses 100 have a maximum depth.

In the specific embodiment of the invention illustrated in FIG. 7, each of the movable members 78 has a range of movement of approximately 60 thousandths of an inch. Therefore, in this specific embodiment of the base section 74, each of the recesses 100 has a maximum depth of 60 thousandths of an inch. When the projections 26 are to have a uniform length, as illustrated in FIG. 2, for an initial or first ceramic article 10, the projections 26 may all have an axial extent of approximately 30 thousandths of an inch. Therefore, to form the projections 26 of FIG. 2, all of the movable members 78 would be positioned so that there end surfaces 96 are located 30 thousandths of an inch from the major side surface area 104 of the base section 74.

It should be understood that the foregoing specific dimensions for the recesses 100 and/or projections 26 have been set forth herein for purposes of clarity of description. It is contemplated that different embodiments of the base section 74 will have different dimensions and that the movable members 78 will have different ranges of movement. Therefore, the invention is not to be limited to any specific dimensions for the recesses 100 and/or range of movement of the movable members 78 unless the dimensions are set forth in one or more claims.

Once the movable members 78 (FIG. 7) have been moved to positions corresponding to desired lengths of the projections 26 on the lower support 12 (FIG. 2) and locked in place with the locking screws 108 and 110, the adjustable base 64 is ready for use in the mold 60 of FIG. 5. At this time, the side walls 66 of the mold are positioned in engagement with side surfaces of the adjustable base, in the manner illustrated schematically in FIG. 5, to form a mold cavity 70. The mold cavity 70 is filled with a suitable ceramic material, such as a ceramic material containing silica and zirconium silicate. Of course, the ceramic material 62 may have a different composition if desired.

When the ceramic material 62 fills the mold cavity 70, in the manner illustrated schematically in FIG. 5, the ceramic material extends across the major side surface area 104 (FIGS. 7 and 8) on the adjustable base 64. The ceramic material 62 also extends into and fills the recesses 100 in the base section 74. Therefore, the ceramic material 62 will engage the end surfaces 96 on the movable members 78 in the manner illustrated schematically in FIG. 8.

Once the ceramic material 62 has solidified to form a solid body, the ceramic material is removed from the mold 60. The ceramic material is then fired to form the lower support 12.

Once the lower support 12 has been formed, the ceramic article 10 may be positioned on the lower support in the manner illustrated schematically in FIG. 2. If desired, the retainer 16 may be omitted. If this is to be done, refractory sands, which will not bond together, may be placed on the upper side 18 of the ceramic article 10 to urge the ceramic article towards the projections 26. Alternatively, flexible bags or other containers of refractory sands may be placed on the ceramic article 10. The bags of particulate will urge the lower side 14 of the ceramic article 10 downward toward the projections 26.

However, it is believed that is may be desired to utilize a retainer or upper setter block, similar to the retainer 16 of FIG. 2, in association with the lower support 12. The retainer 16 may advantageously be formed in the same manner as previously described in conjunction with the lower support 12. Thus, to form the retainer 16, a mold 122 (FIG. 9) is utilized to shape ceramic material 124 to a configuration corresponding a configuration of the retainer 16. The mold 122 has a construction which is generally the same as the construction of the mold 60 of FIG. 5. However, it should be understood that the retainer 16 may be formed in a different manner if desired.

Figure 9:
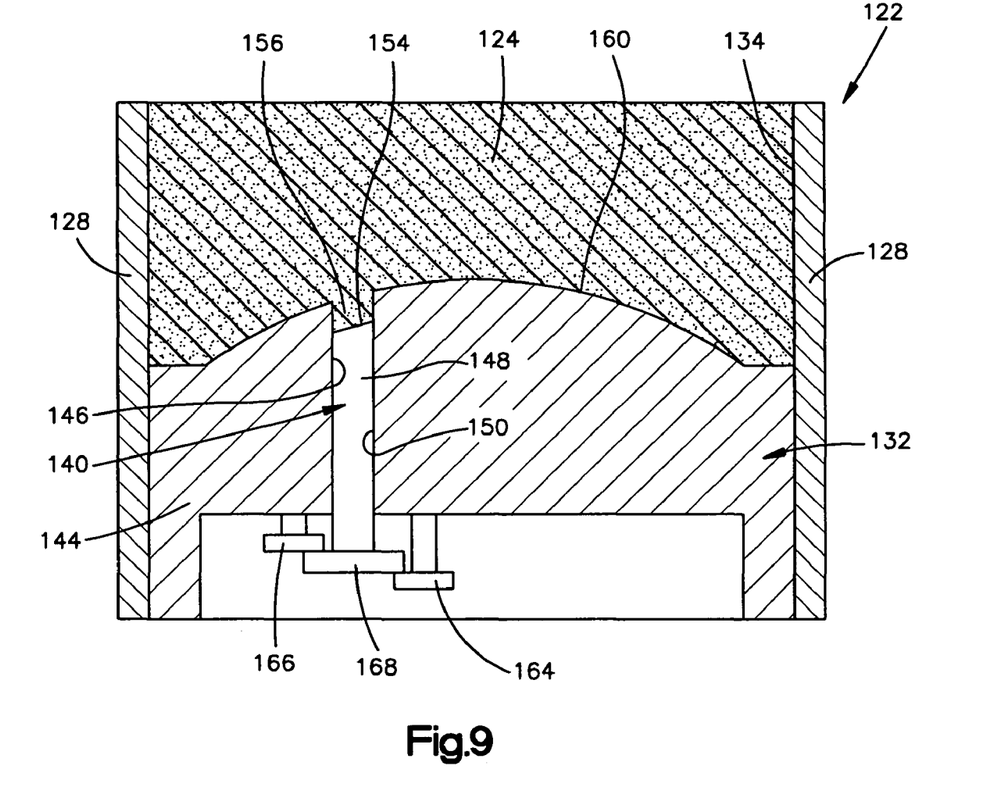
FIG. 9 is a schematized illustration, generally similar to FIG. 5, depicting the manner in which an adjustable mold is utilized to mold material to form the retainers or upper setters of FIGS. 2 and 4.

The mold 122 includes side walls 128 which cooperate with a second adjustable base 132 to form a mold cavity 134 (FIG. 9). The mold cavity 134 is filled with the ceramic material 124. The ceramic material is solidified and removed from the mold 122. The ceramic material 124 is then fired to form the retainer 16.

The second adjustable base 132 has a construction which is generally the same as the construction of the adjustable base 64 (FIGS. 6-8). Thus, the second adjustable base 132 includes a plurality of movable members 140 (FIG. 9) corresponding to the movable members 78 (FIG. 7). Although only a single movable member 140 has been illustrated schematically in FIG. 9, it should be understood that there are a plurality of movable members disposed on a base section 144 of the second adjustable base 132.

Although any desired number of movable members 140 may be provided, in the embodiment illustrated in FIG. 9, the number of movable members 140 on the base section 144 of the second adjustable base 132 is equal to the number of movable members 78 on the base section 74 of the adjustable base 64 (FIGS. 6 and 7). Thus, for each of the movable members 78 on the base section 74 of the adjustable base 64, there is a corresponding movable member on the base section 144 of the second adjustable base 132. However, it should be understood that the number of movable members 140 on the base section 144 (FIG. 9) may be either greater than or less than the number of movable members 78 (FIG. 7) on the base section 74.

Each of the movable members 140 (FIG. 9) is disposed in a cylindrical hole or opening 146 in the base section 144. Each movable member 140 has a cylindrical outer side surface 148 which is slidable along a cylindrical inner side surface 150 of the hole 146. The movable member 140 has an end surface 154 which cooperates with an inner side surface 150 of the hole 146 to form a recess 156. By moving the movable member 140 axially in the hole or opening 146, the size of the recess 156 can be varied. Thus, the further the end surface 154 of the movable member 140 is from a major side surface area 160 on the base section 144, the greater is the axial extent of the recess 156.

Locking screws 164 and 166 engage the head end portion 168 of the movable member 140. The locking screws 164 and 166 engage the head end portion 168 of the movable member 140 to hold the movable member against movement from a desired position relative to the base section 144 in the same manner as previously explained in conjunction with the locking screws 108 and 110 and movable members 78 of FIG. 7.

The major side surface area 104 (FIGS. 7 and 8) on the base section 74 has a generally concave configuration. This is because the lower support 12 cooperates with the concave (as viewed in FIG. 2) lower side 14 of the ceramic article 10. The retainer 16 cooperates with the convex upper side 18 of the ceramic article 10. Therefore, the base section 144 of the second adjustable base 132 (FIG. 9) has a convex (as viewed in FIG. 9) major side surface 160 which is utilized to shape the major side surface 46 (FIG. 2) on the retainer 16. The projections 34 on the retainer are shaped by the recesses 156 (FIG. 9) in the base section 44. When the mold cavity 134 is filled with ceramic material, the ceramic material extends across the major side surface area 160 on the base section 144 and extends into the recesses 156 in the base section. Although the ceramic material 124 may be any desired ceramic material, it is contemplated that the ceramic material 124 may be a silica and zirconium silicate material.

When the ceramic material 124 has solidified in the mold cavity 134, the ceramic material is removed from the mold cavity and fired. This results in the formation of the retainer 16.

It should be understood that the second adjustable base 132 (FIG. 9) can be adjusted to accommodate changes in the configuration of the ceramic article 10 in the same manner as previously discussed in conjunction with the adjustable base 64 of FIGS. 6 and 7. Thus, the movable members 140 (FIG. 9) on the base section 144 of the second adjustable base 132 can be moved relative to the base section to change the size of the recesses 156. If the movable members 140 are moved to increase the size of the recesses that is, the distance in which the recesses 156 extend downward (as viewed in FIG. 9), the size of the projections 34 on the retainer 16 are increased. Similarly, if the movable members 140 are moved to decrease the size, that is, the axial extent, of the recesses 156, the size of the corresponding projections 34 on the retainer 16 (FIG. 2) are decreased.

When the lower support 12 and retainer 16 (FIG. 2) are to be utilized to provide support for the ceramic article 10 during firing of the ceramic article, the ceramic article 10 is first positioned on the projections 26 of the lower support 12. At this time, the ceramic article 10 is supported by engagement with upper end portions of the projections 26. The retainer 16 is then positioned relative to the lower support 12. To position the retainer 16 relative to the lower support 12, a reference surface 180 (FIG. 2) on the retainer 16 is positioned in abutting engagement with a similar reference surface 182 on the lower support 12.

Engagement of the reference surface 180 on the retainer 16 with the reference surface 182 on the lower support 12 is effective to position the projections 34 on the retainer 16 in alignment with the projections 26 on the lower support 12. The projections 34 on the retainer 16 have central axes which are coincident with the central axes of the projections on the support 12 (FIG. 2). However, the central axes of the projections 34 may be offset from the central axes of the projections 26. At this time, outer side surfaces 188 and 190 on the retainer 16 are aligned with outer side surfaces 192 and 194 on the lower support 12.

Although the projections 34 on the retainer 16 have been illustrated in FIG. 2 as engaging the upper sides 18 of the ceramic article 10 when the retainer 16 is disposed on the lower support 12, the lower end portions of the projections are spaced a very small distance from the upper side surface 18 on the ceramic article 10. Thus, there is a gap of approximately 3 thousandths of an inch between the lower end portions (as viewed in FIG. 2) of the projections 34 and the upper side surface 18 of the ceramic article 10. Therefore, the entire weight of the retainer 16 is transmitted to the lower support 12 at the location where the reference surface 180 on the retainer 16 engages the reference surface 182 on the lower support. At this time, the ceramic article 10 is loosely held between the lower support 12 and retainer 16.

During firing of the ceramic article 10 while it is supported on the lower support 12 and retained in position by the retainer 16, in the manner illustrated schematically in FIG. 2, there is a slight shrinkage of the ceramic article 10. Therefore, in the absence of minimal upward curling or deflection of the ceramic article 10, the ceramic article is maintained in a spaced apart relationship with the projections 34 throughout firing. However, it is contemplated that there may be some upward curling or deflection of the ceramic article 10 during firing so that the upper side 18 of the ceramic article engages the lower (as viewed in FIG. 2) end portions of the projections 34.

Of course, the projections 34 may have a length so as to enable the projections to engage the upper side 18 of the ceramic article 10 when the retainer 16 is positioned on the lower support 12 in the manner illustrated schematically in FIG. 2. This would limit the upward curling or deflection of the ceramic article 10 during firing to a function of the slight shrinkage of the ceramic article 10 during firing.

In view of the foregoing description, it is apparent the present invention provides a new and improved method of providing support for ceramic articles during firing of the ceramic articles. A support 12 for a first ceramic article 10 (FIG. 2) having a first configuration is formed. This first support 12 is used during firing of the first ceramic article 10. When a second ceramic article 10*a* (FIG. 4) having a different configuration is to be fired, a support 12*a* having a configuration which is a function of the configuration of the second ceramic article 10*a* is formed. The second support 12*a* is used to support the second ceramic article 10*a* during firing of the second ceramic article.

In addition to the support 12 (FIG. 2) which engages the lower side 14 of the ceramic article 10 during firing of the article, a retainer 16 may be provided to limit upward movement of the article during firing of the article. The retainer 16 and the support 12 cooperate to maintain the desired configuration of the ceramic article 10 during firing.

The support 12 may have a first or lower array 24 of projections 26 which extend upward (as viewed in FIG. 2) from a base 42 of the support and engage a lower side 14 of the ceramic article during firing of the ceramic article. The retainer 16 may have a second array 32 of projections 34 which extend downward (as viewed in FIG. 2) from a base 48 of the retainer and are adjacent to the upper side 18 of the ceramic article 10 while the lower side 14 of the ceramic article 10 is engaged by the first array 24 of projections 26 during firing of the ceramic article.

The support 12 and/or retainer 16 may be formed with adjustable molds 60 and/or 122. The adjustable mold 60 or 122 may each have a base 74 or 132 with a plurality of movable members 78 or 140 which are disposed in recesses 82 or 146 which extend away from a side surface 104 or 160 of the base. The movable members 78 or 140 may cooperate with surfaces 88 or 150 of the recesses 82 or 146 to at least partially define open end portions of the recesses. During forming of either the support 12 or the retainer 16, moldable material 62 or 124 may fill the open end portions of the recesses 82 or 146 and extend at least part way across a side surface 104 or 160 on the base 74 or 144 of the mold 60 or 122.

It should be understood that the present invention has a plurality of features which may be used separately or together in the manner disclosed herein. For example, ceramic articles 10 or 10*a* may be supported during firing by engaging only the lower side of the ceramic articles with a support 12 or 12*a*. Alternatively, during firing of ceramic articles 10 or 10*a*, a support 12 or 12*a* may engage the lower side 14 or 14*a* of the ceramic articles while a retainer 16 or 16*a* limits upward movement of the upper side of the ceramic articles to hold the ceramic articles between the support and the retainer. Although the support 12 and/or the retainer 16 may be formed with projections 26 and/or 34 which engage surfaces 14 or 18 of a ceramic article, the projections may be omitted if desired. Although adjustable molds 60 and/or 122 may be used to form the support 12 and/or retainer 16, they may be formed with molds which are not adjustable.

Having described the invention, the following is claimed:

1. A method of providing support for ceramic articles during firing of the ceramic articles, said method comprising the steps of providing a first support, engaging a lower side of a first ceramic article with a first array of projections which extend upward from a base of said first support, providing a first retainer, positioning a first reference surface on the base of the first support and a second reference surface on a base of the first retainer in engagement, limiting upward movement of an upper side of the first ceramic article with a second array of projections which extend downward from a base of said first retainer, firing the first ceramic article while the lower side of the first ceramic article is engaged by the first array of projections and while the upper side of the first ceramic article is adjacent to the second array of projections and while the first reference surface and the second reference surface are disposed in engagement, providing a second support, engaging a lower side of a second ceramic article with a third array of projections which extend upward from a base of said second support, said second ceramic article having a configuration which is different than the configuration of said first ceramic article, providing a second retainer, positioning a third reference surface on the base of the second support and a fourth reference surface on a base of the second retainer in engagement, limiting upward movement of an upper side of the second ceramic article with a fourth array of projections which extend downward from a base of said second retainer, and firing the second ceramic article while the lower side of the second ceramic article is engaged by the third array of projections and while the upper side of the second ceramic article is adjacent to the fourth array of projections and while the third reference surface and the fourth reference surface are disposed in engagement.

2. A method as set forth in claim 1 wherein said step of providing a second support includes providing a second support in which projections in the third array of projections have positions relative to the base of the second support which correspond to and are the same as positions of projections in the first array of projections relative to the base of the first support, at least some of the projections in the third array of projections have lengths which are different than lengths of corresponding projections in the first array of projections.

3. A method as set forth in claim 2 wherein said step of providing a second retainer includes providing a second retainer in which projections in the fourth array of projections have positions relative to the base of the second retainer which correspond to and are the same as positions of projections in the second array of projections relative to the base of the first retainer, at least some of the projections in the fourth array of projections have lengths which are different than lengths of corresponding projections in the second array of projections.

4. A method as set forth in claim 1 wherein said steps of engaging a lower side of the first ceramic article with a first array of projections and limiting upward movement of an upper side of the first ceramic article with a second array of projections includes positioning at least some of the projections in the first and second arrays of projections in a coaxial relationship, said steps of engaging a lower side of the second ceramic article with a third array of projections and limiting upward movement of an upper side of the second ceramic article with a fourth array of projections includes positioning at least some of the projections in the third and fourth arrays of projections in a coaxial relationship.

5. A method as set forth in claim 4 wherein at least some of the projections in the third array of projections have a length which is different than a length of projections in the fourth array of projections, said step of positioning at least some of the projections in the third and fourth arrays of projections in a coaxial relationship includes positioning relatively long projections in one of the third and fourth arrays of projections in a coaxial relationship with relatively short projections in the other one of the third and fourth arrays of projections.

* * * * *